United States Patent
Sun et al.

(10) Patent No.: US 12,337,501 B2
(45) Date of Patent: Jun. 24, 2025

(54) FORMALDEHYDE-FREE MEDIUM-HIGH-DENSITY BOARD CAPABLE OF MEETING DEEP FACING REQUIREMENTS AND METHOD FOR MANUFACTURING SAME

(71) Applicants: BEIJING FORESTRY UNIVERSITY, Beijing (CN); POWER DEKOR GROUP CO., LTD., Shanghai (CN); HUNAN FORESTECH NEW MATERIALS CO., LTD., Zhuzhou (CN)

(72) Inventors: Runcang Sun, Beijing (CN); Tongqi Yuan, Beijing (CN); Xiaolong Chen, Beijing (CN); Supeng Wang, Beijing (CN); Yueying Chen, Beijing (CN); Xianpeng Zhou, Beijing (CN)

(73) Assignees: BEIJING FORESTRY UNIVERSITY, Beijing (CN); POWER DEKOR GROUP CO., LTD., Shanghai (CN); HUNAN FORESTECH NEW MATERIALS CO., LTD., Zhuzhou (CN)

( * ) Notice: Subject to any disclaimer, the term of this patent is extended or adjusted under 35 U.S.C. 154(b) by 308 days.

(21) Appl. No.: 17/504,215

(22) Filed: Oct. 18, 2021

(65) Prior Publication Data
US 2022/0032494 A1    Feb. 3, 2022

Related U.S. Application Data

(63) Continuation of application No. PCT/CN2019/118805, filed on Nov. 15, 2019.

(30) Foreign Application Priority Data

Jun. 28, 2019 (CN) .......................... 201910579820.3

(51) Int. Cl.
B27N 3/00 (2006.01)
B27N 3/04 (2006.01)
(Continued)

(52) U.S. Cl.
CPC ............... *B27N 3/002* (2013.01); *B27N 3/04* (2013.01); *B27N 3/18* (2013.01); *C09J 175/04* (2013.01);
(Continued)

(58) Field of Classification Search
CPC . B27N 3/002; B27N 3/06; B27N 3/04; B27N 1/02; B27N 1/0209; B27N 3/02; B27N 3/18
See application file for complete search history.

(56) References Cited

U.S. PATENT DOCUMENTS

2010/0300030 A1* 12/2010 Pervan ................ B32B 21/13
428/292.4
2015/0210904 A1* 7/2015 Cothran ............... B32B 21/14
156/283
2021/0362367 A1* 11/2021 Feng ...................... B27N 3/04

FOREIGN PATENT DOCUMENTS

WO    WO-2016079124 A1 *  5/2016

OTHER PUBLICATIONS

Dai (English Translation of CN108818839). (Year: 2018).*
(Continued)

*Primary Examiner* — Michael A Tolin
*Assistant Examiner* — Hana C Page

(57) ABSTRACT

The present invention relates to a formaldehyde-free medium-high-density board capable of meeting deep facing requirements, and a method for manufacturing same. The method includes: wood chipping, screening, cooking and softening, fiber separating, gluing, drying and sorting, paving, pre-pressing, hot pressing, cooling, sanding, and inspec-
(Continued)

tion and warehousing, where the gluing is two-step gluing, including: first performing gluing once by using a lignin adhesive, and then performing secondary gluing by using an MDI adhesive after waterproof treatment. According to the manufacturing method of the present invention, by using biomass adhesives and formaldehyde-free adhesives without adding additives such as a curing agent and an anti-mildew agent, formaldehyde pollution is eliminated from the source by using a two-step gluing method, so that production is formaldehyde-free, and the product is formaldehyde-free. Through the sequential control of the gluing process and the grasp of the gluing type and ratio, surface hardness of the product is improved, and the final product is capable of deep facing to reach 20 to 80 filaments.

7 Claims, 2 Drawing Sheets

(51) Int. Cl.
    *B27N 3/18*     (2006.01)
    *C09J 175/04*     (2006.01)
    *C09J 197/00*     (2006.01)
    *C08K 3/22*     (2006.01)
    *C08K 5/3492*     (2006.01)

(52) U.S. Cl.
    CPC .............. *C09J 197/005* (2013.01); *C08K 3/22* (2013.01); *C08K 5/34922* (2013.01)

(56) References Cited

OTHER PUBLICATIONS

Sari ("The role of solid content of adhesive and panel density on the dimensional stability and mechanical properties of particleboard," Journal of Composite Materials, vol. 47, Issue 10, May 2013, pp. 1247-1255). (Year: 2013).*

* cited by examiner

FORMALDEHYDE-FREE MEDIUM-HIGH-DENSITY BOARD CAPABLE OF MEETING DEEP FACING REQUIREMENTS AND METHOD FOR MANUFACTURING SAME

This application is proposed based on the Chinese Patent Application No. 201910579820.3 filed on Jun. 28, 2019 and claims priority to the Chinese patent application, which is incorporated herein by reference in its entirety.

TECHNICAL FIELD

The present invention relates to the field of wood processing, and in particular, to a formaldehyde-free medium-high-density board capable of meeting deep facing requirements and a method for manufacturing same.

BACKGROUND ART

With the development of our society, the change of people's lifestyles, and the purpose of protecting forestry resources, the medium-high-density board capable, as a substitute for wood furniture panels, has been rapidly developed at home and abroad, and is widely used in fields such as furniture, interior decoration, and packaging materials. However, due to the use of formaldehyde-based adhesives in the production process, the formaldehyde pollution problem caused by it cannot be ignored. Formaldehyde has long been recognized as one of the main pollution sources in the MDF board industry, and after entering the home, free formaldehyde in the MDF board is still continuously released. With the increasing attention to the environmental protection of building materials, and the market's demand for product diversification, the development prospects of producing wood-based panels based on formaldehyde-free adhesives are promising. Therefore, the development of a new manufacturing process that is environmentally friendly and can realize the production of MDF boards without formaldehyde has become one of the current research hotspots.

At present, formaldehyde-free adhesives for manufacturing medium-high-density boards are still limited, and a relatively mature one is an MDI adhesive (the MDI adhesive is a diphenylmethane diisocyanate adhesive and its modified adhesive), but the MDI adhesive has problems such as high molecular activity, excessively fast reaction, being easy to react with water, and being easy to stick to the board. In actual production, due to the high surface hardness of the board, the single MDI adhesive substrate is only suitable for the glossy surface type during floor lamination. A surface whitening phenomenon occurs during lamination of surface types that have relatively deep surface lines such as a mold pressing surface, a large relief surface, and a hand-scraped surface, and a processing requirement of deep facing cannot be met, and application fields thereof are restricted.

SUMMARY OF THE INVENTION

The main purpose of the present invention is to provide a formaldehyde-free medium-high-density board capable of meeting deep facing requirements and a method for preparing same. The technical problem to be solved is to control a gluing process and grasp types and proportions of gluing, so that the medium-high-density board obtained is formaldehyde-free and capable of deep facing, making it more suitable for actual production.

The purpose of the present invention and the technical problem to be solved thereof are implemented by using the following technical solutions. A method for manufacturing a formaldehyde-free medium-high-density board capable of meeting deep facing requirements includes: wood chipping, screening, cooking and softening, fiber separating, gluing, drying and sorting, paving, pre-pressing, hot pressing, cooling, sanding, and inspection and warehousing, where the gluing is two-step gluing, including: first performing primary gluing by using a lignin adhesive, and then performing secondary gluing by using an MDI adhesive after waterproof treatment.

The purpose of the present invention and the technical problem to be solved thereof may be further implemented by using the following technical measures.

Preferably, according to the method for manufacturing a formaldehyde-free medium-high-density board capable of meeting deep facing requirements, before the hot pressing, surface spraying is added, and the surface spraying includes: spraying free water on a surface of a slab after the pre-pressing, so that a water content of fiber of the slab is 8% to 12%.

Preferably, according to the method for manufacturing a formaldehyde-free medium-high-density board capable of meeting deep facing requirements, the lignin adhesive includes components with the following weight percentages:

| | |
|---|---|
| lignin | 20% to 45%; |
| sodium hydroxide | 2.0% to 8.5%; |
| melamine | 2% to 8%; |
| polyvinyl alcohol | 0.2% to 1.0%; |
| urea | 2% to 6%; |
| water | 40% to 70%. |

Preferably, according to the foregoing method for manufacturing a formaldehyde-free medium-high-density board capable of meeting deep facing requirements, a solid content of the lignin adhesive is 30% to 60%, and an application amount of the lignin adhesive is 50 kg/m$^3$ to 80 kg/m$^3$.

Preferably, according to the method for manufacturing a formaldehyde-free medium-high-density board capable of meeting deep facing requirements, the waterproof treatment is to apply a waterproof agent on a surface of fiber on which the lignin adhesive is applied, the waterproof agent is paraffin wax, and an application amount of the paraffin wax is 4 kg/m$^3$ to 6 kg/m$^3$.

Preferably, according to the method for manufacturing a formaldehyde-free medium-high-density board capable of meeting deep facing requirements, before the secondary gluing, a ratio of the MDI adhesive to water is adjusted to 1:1 to 1:3 based on an initial viscosity of the MDI adhesive, and an application amount of the MDI adhesive is 10 kg/m$^3$ to 40 kg/m$^3$.

Preferably, according to the method for manufacturing a formaldehyde-free medium-high-density board capable of meeting deep facing requirements, a raw material of the wood is one or more of *eucalyptus* wood, cotton wood, pine wood, and mixed hard woods.

Preferably, according to the method for manufacturing a formaldehyde-free medium-high-density board capable of meeting deep facing requirements, in the drying and sorting step, fiber is dried to a water content of 5% to 10%.

The purpose of the present invention and the technical problem to be solved thereof may be further implemented by using the following technical solutions. According to a formaldehyde-free medium-high-density board capable of meeting deep facing requirements provided in the present invention, the medium-high-density board is manufactured by using the method for manufacturing a formaldehyde-free medium-high-density board capable of meeting deep facing requirements.

The purpose of the present invention and the technical problem to be solved thereof may be further implemented by using the following technical measures.

Preferably, according to the foregoing formaldehyde-free medium-high-density board capable of meeting deep facing requirements, the formaldehyde-free medium-high-density board capable of meeting deep facing requirements is capable of implementing 20-80-filament deep facing.

Based on the foregoing technical solutions, the formaldehyde-free medium-high-density board capable of meeting deep facing requirements and the method for manufacturing same provided in the prevent invention have at least the following advantages:

The manufacturing method of the present invention adopts a two-step gluing method. First, primary gluing is performed by using a lignin adhesive, and then secondary gluing is performed by using an MDI adhesive after waterproof treatment. The lignin adhesive has good permeability and anti-mildew and anti-corrosion properties. After the first gluing, uniform gluing can be implemented. After the lignin adhesive is applied for the first time, a waterproof agent paraffin wax is added, which can effectively wrap the fiber, namely, can play a waterproof role and can also increase its strength to some extent. At the same time, there is interaction between the paraffin wax and the MDI adhesive that is subsequently applied. After the MDI adhesive is applied for the second time, the thermosetting of the MDI adhesive can achieve a better effect in the subsequent hot pressing process. Under the combined action of the foregoing factors, the overall performance of the substrate obtained after the secondary gluing of the present invention, especially the deep-facing performance, is better than that of gluing manners such as the application of a single MDI adhesive, the application of a single lignin adhesive, and direct mixed gluing of the lignin adhesive and the MDI adhesive.

The present invention adopts the two-step gluing method, which has obvious advantages compared with a manufacturing process of adding a single MDI adhesive or a single lignin adhesive. First, on the basis of reaching the formaldehyde-free level, the product has superior physical and chemical properties, and meets the processing requirement of an end customer for deep facing. By improving the surface hardness of the product, the present invention can make up for the disadvantage that the MDI adhesive method cannot be applied to deep facing, greatly expand the application fields of medium-high-density boards, and provide more possibilities for realizing industrial upgrading. Second, the raw materials used are all environmentally friendly, and no curing agent, anti-mildew agent and other additives are added to avoid environmental hazards and conform to the concept of green production. Through continuous experiments, screening the adhesive type, adjusting the gluing ratio and gluing method, controlling the ratio of MDI to water, adding the surface spraying link, and the like, the present invention finally finds a balance between the physical and chemical properties reaching the national standard and deep facing of the product, so that the medium-high-density board prepared by the present invention has the advantages of formaldehyde-free environmental protection, diversified application fields, and the like without adding auxiliary agents such as a curing agent.

In the present invention, a step of spraying the surface of the slab is added before hot pressing. This step can ensure that the water content in the fiber formed through pre-pressing is relatively low, delamination does not easily occur, and can increase the water content of the product density board and dimensional stability thereof, to improve productivity.

The manufacturing method of the present invention solves the formaldehyde waste gas pollution problem in the production process of the medium-high-density board and the formaldehyde release problem in the final board product. By using biomass adhesives and formaldehyde-free adhesives, formaldehyde pollution is eliminated from the source, so that production is formaldehyde-free, and the product is formaldehyde-free. Through the sequential control of the gluing process and the grasp of the gluing ratio, the final product is capable of deep facing.

The foregoing description is only an overview of the technical solutions of the present invention.

In order to understand the technical means of the present invention more clearly and implement it according to the content of the description, the preferred embodiments of the present invention will be described in detail below with reference to the accompanying drawings.

DETAILED DESCRIPTION OF THE INVENTION

In order to further explain the technical means of the present invention to achieve the predetermined purpose of the invention and effects thereof, specific implementations, structures, features, and effects of a formaldehyde-free medium-high-density board capable of meeting deep facing requirements and a method for manufacturing same provided in the present invention are described in detail below with reference to the accompanying drawings and preferred embodiments. In the following description, different "one embodiment" or "embodiment" do not necessarily refer to the same embodiment. In addition, specific features, structures, or characteristics in one or more embodiments may be combined in any suitable form.

Figure 1:
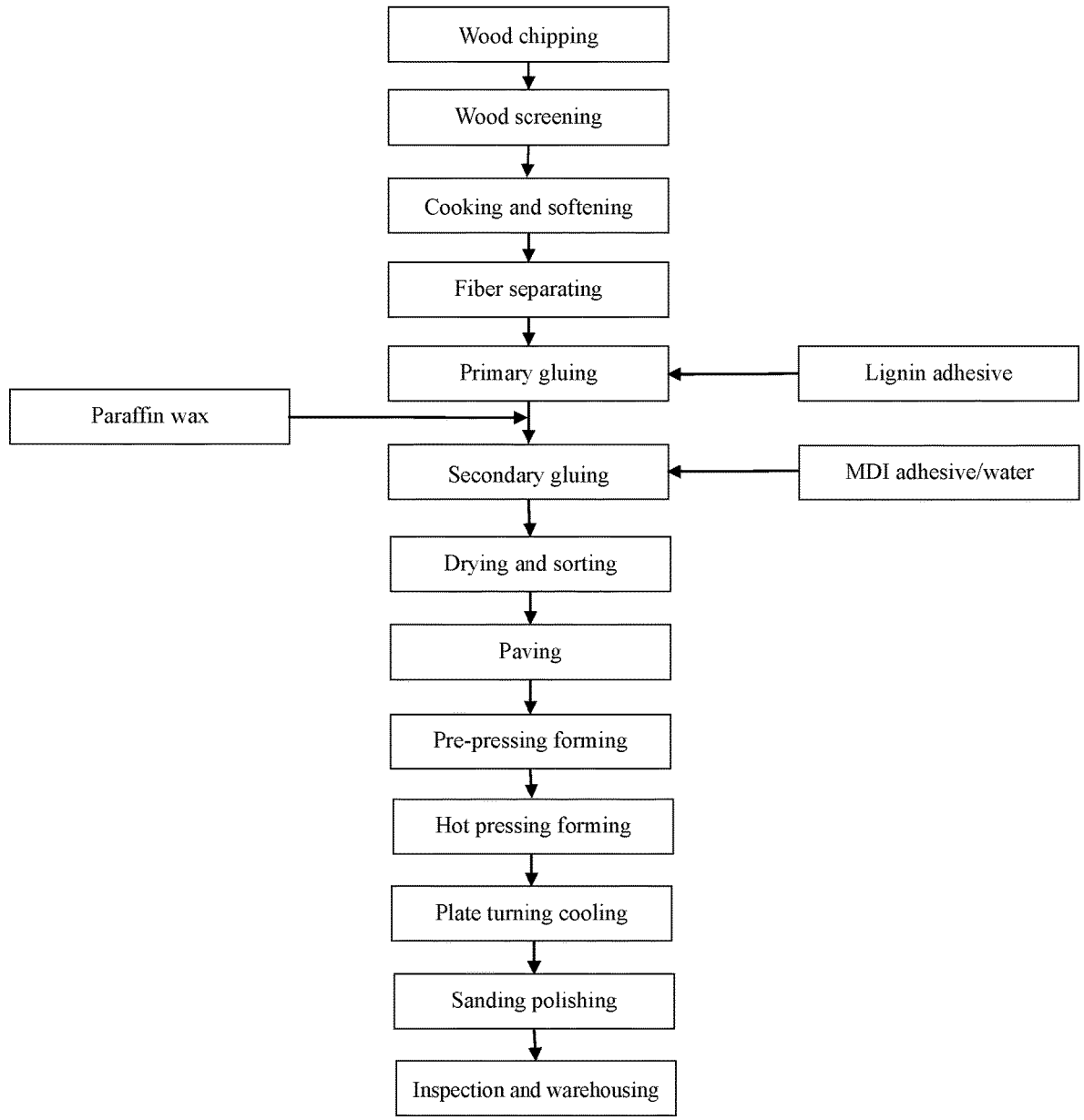
FIG. 1 is a schematic flowchart of a method for manufacturing a formaldehyde-free medium-high-density board capable of meeting deep facing requirements according to an embodiment of the present invention.

An embodiment of the present invention provides a method for manufacturing a formaldehyde-free medium-high-density board capable of meeting deep facing requirements, including: wood chipping, screening, cooking and softening, fiber separating, gluing, drying and sorting, paving, pre-pressing, hot pressing, cooling, sanding, and inspection and warehousing, where the gluing is two-step gluing, including: first performing primary gluing by using a lignin adhesive, and then performing secondary gluing by using an MDI adhesive after waterproof treatment. FIG. 1 is a schematic flowchart of a manufacturing method according to an embodiment of the present invention.

Raw materials of wood are not specifically limited in implementation of the present invention. In principle, materials that can meet the requirements for the production of density boards are all suitable for the embodiments of the present invention.

The implementation of the present invention does not specifically limit application methods of the lignin adhesive and the MDI adhesive. Conventional application methods may be used. In the embodiments of the present invention, by using biomass adhesives and formaldehyde-free adhesives without adding additives such as a curing agent and an anti-mildew agent, formaldehyde pollution is eliminated from the source by using a two-step gluing method, so that production is formaldehyde-free, and the product is formaldehyde-free. Through the sequential control of the gluing process and the grasp of the gluing type and ratio, the final product is capable of deep facing.

The lignin adhesive has relatively poor physical mechanical performance and water resistance compared with the MDI adhesive, but has relatively good permeability and has anti-mildew and anti-corrosion properties. After the primary gluing, uniform gluing can be implemented. After the primary gluing, a waterproof agent paraffin wax is added, which can effectively wrap the fiber, namely, can play a waterproof role and can also increase its strength to some extent. At the same time, there is interaction between the paraffin wax and the MDI adhesive that is subsequently applied. In addition, compared with the lignin adhesive, the thermosetting of the MDI adhesive can achieve a better effect in the subsequent hot pressing process. Under the combined action of the foregoing factors, physical and chemical performance of the substrate obtained after the second gluing by using the MDI adhesive, is similar to that of the single MDI adhesive, and is superior over that of the gluing manner by using a single lignin adhesive, and direct mixed gluing of the lignin adhesive and the MDI adhesive, and other multiple gluing manners (for example, first using the MDI adhesive, then using the lignin adhesive, and then performing waterproof treatment, first using the lignin adhesive, then using the MDI adhesive, and then performing waterproof processing, or first using the MDI adhesive, and then using the lignin adhesive after waterproof treatment).

Figure 2:
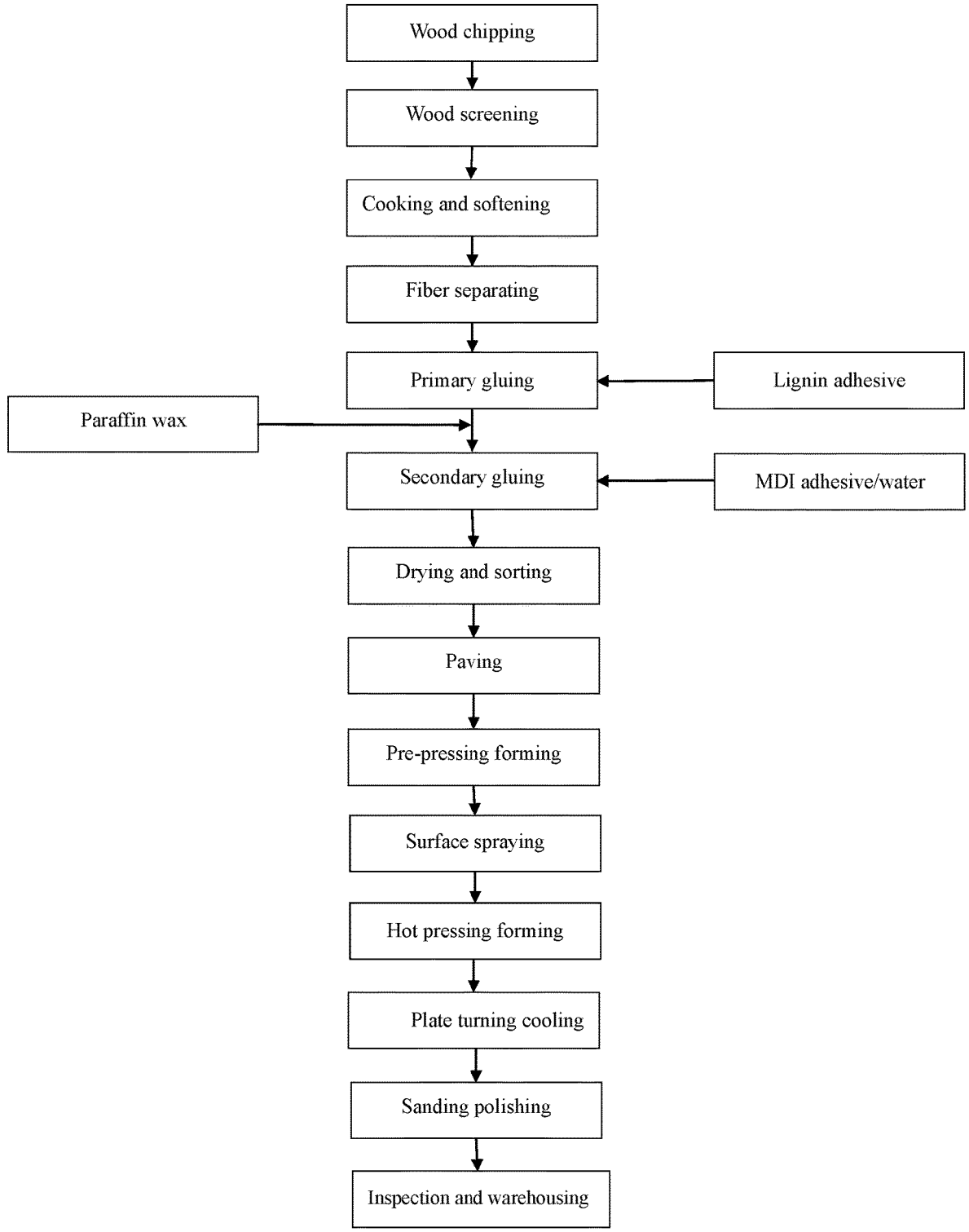
FIG. 2 is a schematic flowchart of a method for manufacturing a formaldehyde-free medium-high-density board capable of meeting deep facing requirements according to another embodiment of the present invention.

Preferably, another embodiment of the present invention provides a method for manufacturing a formaldehyde-free medium-high-density board capable of meeting deep facing requirements, compared with the foregoing embodiment, the manufacturing method of this embodiment further includes: before the hot pressing, surface spraying is added, and the surface spraying includes: spraying free water on a surface of a slab after the pre-pressing, so that a water content of fiber of the slab is 8% to 12%. FIG. 2 is a schematic flowchart of a manufacturing method according to an embodiment of the present invention.

It should be noted that making the water content of the fiber of the slab 8% to 12% means that the water content of the fiber of the slab is made to 8% to 12% after the surface is sprayed with free water and before a board is formed through hot pressing, and then the water content of the density board after the hot pressing can be maintained at 4% to 8%.

In this embodiment, surface spraying is added between steps of pre-pressing and hot pressing. This can ensure that the water content in the fiber formed through pre-pressing is relatively low, and delamination does not easily occur. Adding surface spraying can also effectively control the water content of a core layer, prevent delamination, and improve production efficiency. It can also make the board finally formed through hot pressing have a relatively high water content, reduce the water absorption thickness expansion rate of the board, and improve the dimensional stability of the board. In this embodiment of the present invention, a density board with a water content of 4% to 8% can be obtained. This process does not exist for the common MDI adhesive, and the water content after production is 2% to 3%.

In this embodiment of the present invention, the surface of the slab is sprayed before the hot pressing process. This not only improves the water content of the slab and its dimensional stability, but also effectively avoids delamination and improves productivity. Certainly, adding some curing agents can make the physical and chemical performance of the product of the present invention more superior. However, on one hand, in consideration of that most curing agents have toxicity, and are not environmentally friendly and do not conform to the concept of green production, and on the other hand, in order to meet the processing requirement of an end customer for deep facing, through continuous experiments, screening the adhesive type, adjusting the gluing ratio and gluing method, controlling the ratio of MDI to water, adding the surface spraying link, and the like, the present invention finally finds a balance between the physical and chemical properties reaching the national standard and deep facing of the product, so that the medium-high-density board prepared by the present invention has the advantages of formaldehyde-free environmental protection, diversified application fields, and the like without adding auxiliary agents such as a curing agent.

The foregoing embodiment does not specifically limit the lignin adhesive. Preferably, the lignin adhesive satisfies pH>7, boiling point of approximately 100° C., and density of 1.2 g/m$^3$.

In a preferred implementation, the lignin adhesive includes components with the following weight percentages:

| | |
|---|---|
| lignin | 20% to 45%; |
| sodium hydroxide | 2.0% to 8.5%; |
| melamine | 2% to 8%; |
| polyvinyl alcohol | 0.2% to 1.0%; |
| urea | 2% to 6%; |
| water | 40% to 70%. |

A method for preparing the lignin adhesive is to first dissolve lignin with a sodium hydroxide solution, reduce the viscosity of a lignin lye by adding urea, then add melamine for a particular degree of condensation reaction with lignin at high temperature, and finally add the dissolved polyvinyl alcohol aqueous solution to improve the initial viscosity of the lignin adhesive.

The lignin adhesive of this embodiment of the present invention uses sodium hydroxide alkaline conditions to dissolve lignin, uses polyvinyl alcohol to improve the initial viscosity, and uses urea to reduce the viscosity of lignin, and uses melamine to promote the self-bonding of lignin under the action of high temperature to act as an adhesive. In the preparation process, no formaldehyde is added, the product is formaldehyde-free, and the lignin has high bonding strength after self-bonding during high temperature curing and good water resistance.

In a preferred implementation, the solid content of the lignin adhesive is 30% to 60%, preferably 40% to 50%, and the application amount of the lignin adhesive is 50 kg/m$^3$ to 80 kg/m$^3$, preferably 60 kg/m$^3$ to 70 kg/m$^3$. With reference to cost factors and environmental protection factors, under the premise of ensuring product performance, the gluing amount of the lignin adhesive should be as high as possible.

The application method of the lignin adhesive is preferably: the lignin adhesive is atomized by using a nozzle through a delivery pump, and then added to a fiber delivery pipe to be uniformly mixed with the fiber.

In a preferred implementation, the waterproof treatment is to apply a waterproof agent on the surface of the lignin adhesive, the waterproof agent is paraffin wax, and the application amount of the paraffin wax is 4 kg/m$^3$ to 6 kg/m$^3$, preferably 5 kg/m$^3$.

The paraffin wax waterproof agent is preferably applied in the following manner: the paraffin wax waterproof agent is atomized by using a nozzle through a delivery pump, and then added to a fiber delivery pipe to be uniformly mixed with the fiber.

In a preferred implementation, before the secondary gluing, according to the initial viscosity of the MDI adhesive, the ratio of the MDI adhesive to water is adjusted to be 1:1 to 1:3, preferably 1:2, and the application amount of the MDI adhesive is 10 kg/m$^3$ to 40 kg/m$^3$, preferably 15 kg/m$^3$ 28 kg/m$^3$.

In this embodiment of the present invention, the ratio of the MDI adhesive to water is adjusted according to the initial viscosity of the MDI adhesive. The MDI adhesive and water separately pass through separate pumps and are mixed in a tee, and gluing is performed under high-pressure jetting.

The application method of the MDI adhesive is preferably: the MDI adhesive is atomized by using a nozzle through a delivery pump, and then added to a fiber delivery pipe. In an optional implementation, a raw material of the wood is one or more of *eucalyptus* wood, cotton wood, pine wood, and mixed hard woods.

In an optional implementation, in the drying and sorting step, the fiber is dried to a water content of 5% to 10%, preferably, 6% to 8%.

Another embodiment of the present invention provides a formaldehyde-free medium-high-density board capable of meeting deep facing requirements, which is manufactured by using the method for manufacturing a formaldehyde-free medium-high-density board capable of meeting deep facing requirements.

The formaldehyde-free medium-high-density board capable of meeting deep facing requirements in this embodiment of the present invention is obtained by using the two-step gluing method, and has obvious advantages compared with a manufacturing process of adding a single MDI adhesive or a single lignin adhesive. First, on the basis of reaching the formaldehyde-free level, the product has superior physical and chemical properties, and meets the processing requirement of an end customer for deep facing. By improving the surface hardness of the product, the present invention can make up for the disadvantage that the MDI adhesive method cannot be applied to deep facing, greatly expand the application fields of medium-high-density boards, and provide more possibilities for realizing industrial upgrading. Second, the raw materials used are all environmentally friendly, and no curing agent, anti-mildew agent and other additives are added to avoid environmental hazards and conform to the concept of green production. Through continuous experiments, screening the adhesive type, adjusting the gluing ratio and gluing method, controlling the ratio of MDI to water, adding the surface spraying link, and the like, the present invention finally finds a balance between the physical and chemical properties reaching the national standard and deep facing of the product, so that the medium-high-density board prepared by the present invention has the advantages of formaldehyde-free environmental protection, diversified application fields, and the like without adding auxiliary agents such as a curing agent. In the present invention, a step of spraying the surface of the slab is added before hot pressing. This step can ensure that the water content in the fiber formed through pre-pressing is relatively low, delamination does not easily occur, and can increase the water content of the product density board and dimensional stability thereof, to improve productivity.

In a preferred implementation, the formaldehyde-free medium-high-density board capable of meeting deep facing requirements can implement 20-80-filament deep facing, preferably, 60-80-filament deep facing.

The formaldehyde-free medium-high-density board capable of meeting deep facing requirements in this embodiment of the present invention is a substrate obtained through two-step gluing of the MDI adhesive and the lignin adhesive, and may be applicable to the glossy surface type of a floor, and may also be used for production of surface types of synchronous patterns, hand-scraped patterns, molding pressing patterns, and the like, and the depth of the synchronous patterns, hand-scraped patterns, and molding pressing patterns may reach 20-80 filaments.

However, the substrate made of the pure MDI adhesive cannot be pressed down for decoration due to the high surface hardness of the board. It can only meet common facing within 10-filament lines, and cannot meet the requirements of deep facing. During lamination of the floor, it is only suitable for the glossy surface type, and the depth of the line can only be within 10 filaments. In addition, the surface whitening phenomenon will appear during lamination of surface types with relatively deep surface lines such as mold pressing lines, large relief lines, and hand-scraped lines. This embodiment of the present invention adopts the substrate produced through the primary gluing of the lignin adhesive and the secondary gluing of the MDI adhesive, to reduce the amount of the MDI adhesive. At the same time, the application of the lignin adhesive reduces the internal hardness of the slab, and deep facing can be performed. It is not only suitable for the glossy surface type, but also can be widely applied to production of surface types such as synchronous lines, hand-scraped lines, and mold pressing lines, so that the application fields of the formaldehyde-free environmentally friendly density board are greatly expanded.

According to the formaldehyde-free medium-high-density board capable of meeting deep facing requirements in this embodiment of the present invention, by using biomass adhesives and formaldehyde-free adhesives without adding additives such as a curing agent and an anti-mildew agent, formaldehyde pollution is eliminated from the source, so that production is formaldehyde-free, and the product is formaldehyde-free. Through the sequential control of the gluing process and the grasp of the gluing type and ratio, surface hardness of the product is improved, and the final product is capable of deep facing.

The following will further describe the present invention with reference to specific embodiments, but it cannot be understood as limiting the scope of protection of the present invention. Some non-essential improvements and adjustments made to the present invention by those skilled in the art based on the above-mentioned content of the present invention still belong to the protection scope of the present invention.

Embodiment 1

A method for manufacturing a formaldehyde-free medium-high-density board capable of meeting deep facing requirements, specifically including the following steps:

(1) wood chipping: cutting a wood raw material *eucalyptus* wood into wood chips that meet the production scale;
(2) wood screening: screening the shredded wood chips to remove the debris, and separating the oversized wood chips for further shredding;
(3) cooking and softening: after screening, cooking and softening wood chips of the moderate size at the cooking pressure of 0.85 MPa, and the cooking time of 3.5 min;
(4) fiber separating: putting the wood chips into a defibrater and separating the fibers mechanically, where the hot mill temperature is 157° C., and the pressure is 0.8 MPa;
(5) primary gluing: performing primary gluing on the fiber, where the gluing adhesive is a lignin adhesive, the gluing amount is 68 kg/m$^3$, the lignin adhesive used is a homemade lignin adhesive, and its components are lignin, sodium hydroxide, melamine, polyvinyl alcohol, urea, and water, and the percentages by weight thereof are respectively 35%, 4.5%, 3.7%, 0.6%, 2.8% and 53.4%;
(6) waterproof treatment: performing waterproof treatment on the fiber after the primary gluing, and adding paraffin wax, where the adding amount is 4.5 kg/m$^3$;
(7) secondary gluing: performing secondary gluing on the fiber, where the gluing adhesive is the MDI adhesive, the gluing amount is 16 kg/m$^3$, and the ratio of the MDI adhesive to water is 1:1.15;
(8) drying and sorting: feeding the gluing fiber to the drying system for drying, so that its water content is 8.1%;
(9) paving pre-pressing: paving the gluing fiber into a slab by using a paving machine, and performing pre-pressing at a pressure of 1.5 MPa;
(10) hot pressing forming: delivering the slab to the hot pressing machine by using a loader, for pressing into a rough board, where the hot pressing machine uses 5 zone temperatures, respectively 236° C., 240° C., 231° C., 212° C., and 190° C., and performing secondary pressurization, that is, the pressure is increased to 33.4 MPa in 3 s, decreased to 4.8 MPa in 14 s, and the pressure is maintained at 8 s/mm, and then increased to 15.9 MPa for curing and thickness fixation, where the hot pressing factor is in the range of 11.6 s/mm;
(11) plate turning cooling: feeding the rough plate into the plate turning machine for cooling, stacking and curing for 72 hours, to the plain plate;
(12) sanding polishing: after sanding, the plain board is sawed to the required size of the board;
(13) inspection and warehousing: grading and packaging the board according to the quality standard requirements, for warehousing; and
(14) downstream processing: in floor processing enterprises, facing decoration is performed on the board, where the facing depth can reach 20 to 80 filaments.

Embodiment 2

A method for manufacturing a formaldehyde-free medium-high-density board capable of meeting deep facing requirements, specifically including the following steps:

(1) wood chipping: cutting a wood raw material cotton wood into wood chips that meet the production scale;
(2) wood screening: screening the shredded wood chips to remove the debris, and separating the oversized wood chips for further shredding;
(3) cooking and softening: after screening, cooking and softening wood chips of the moderate size at the cooking pressure of 0.81 MPa, and the cooking time of 4.0 min;
(4) fiber separating: putting the wood chips into a defibrater and separating the fibers mechanically, where the hot mill temperature is 156° C., and the pressure is 0.84 MPa;
(5) primary gluing: performing primary gluing on the fiber, where the gluing adhesive is a lignin adhesive, the gluing amount is 79 kg/m$^3$, the lignin adhesive used is a homemade lignin adhesive, and its components are lignin, sodium hydroxide, melamine, polyvinyl alcohol, urea, and water, and contents are respectively 40%, 6.0%, 4.5%, 0.5%, 4.5% and 44.5%;
(6) waterproof treatment: performing waterproof treatment on the fiber after the primary gluing, and adding paraffin wax, where the adding amount is 4.9 kg/m$^3$;
(7) secondary gluing: performing secondary gluing on the fiber, where the gluing adhesive is the MDI adhesive, the gluing amount is 17.5 kg/m$^3$, and the ratio of the MDI adhesive to water is 1:1.19;
(8) drying and sorting: feeding the gluing fiber to the drying system for drying, so that its water content is 8.5%;
(9) paving pre-pressing: paving the gluing fiber into a slab by using a paving machine, and performing pre-pressing at a pressure of 1.5 MPa;
(10) surface spraying: spraying water on the upper and lower surfaces of the slab;
(11) hot pressing forming: delivering the slab to the hot pressing machine by using a loader, for pressing into a rough board, where the hot pressing machine uses 5 zone temperatures, respectively 236° C., 241° C., 231° C., 203° C., and 190° C., and performing secondary pressurization, that is, the pressure is increased to 31.5 MPa in 3 s, decreased to 4.8 MPa in 14 s, and the pressure is maintained at 11 s/mm, and then increased to 14.4 MPa for curing and thickness fixation, where the hot pressing factor is in the range of 12.1 s/mm;
(12) plate turning cooling: feeding the rough plate into the plate turning machine for cooling, stacking and curing for 72 hours, to the plain plate;
(13) sanding polishing: after sanding, the plain board is sawed to the required size of the board;
(14) inspection and warehousing: grading and packaging the board according to the quality standard requirements, for warehousing; and
(15) downstream processing: in floor processing enterprises, facing decoration is performed on the board, where the facing depth can reach 20 to 80 filaments.

Comparative Example

A method for manufacturing a medium-high-density board, specifically including the following steps:

(1) wood chipping: cutting a wood raw material *eucalyptus* wood into wood chips that meet the production scale;
(2) wood screening: screening the shredded wood chips to remove the debris, and separating the oversized wood chips for further shredding;
(3) cooking and softening: after screening, cooking and softening wood chips of the moderate size at the cooking pressure of 0.88 MPa, and the cooking time of 4 min;
(4) fiber separating: putting the wood chips into a defibrater and separating the fibers mechanically, where the hot mill temperature is 159° C., and the pressure is 0.8 MPa;
(5) gluing: performing gluing on the fiber, where the gluing adhesive is the MDI adhesive, and the gluing amount is 44 kg/m$^3$;
(6) waterproof treatment: performing waterproof treatment on the glued fiber, and adding paraffin wax, where the adding amount is 4.3 kg/m$^3$;
(7) drying and sorting: feeding the gluing fiber to the drying system for drying, so that its water content is 8.1%;
(8) paving pre-pressing: paving the gluing fiber into a slab by using a paving machine, and performing pre-pressing at a pressure of 1.5 MPa;
(9) hot pressing forming: delivering the slab to the hot pressing machine by using a loader, for pressing into a rough board, where the hot pressing machine uses 5 zone temperatures, respectively 231° C., 239° C., 230° C., 208° C., and 180° C., and performing secondary pressurization, that is, the pressure is increased to 30 MPa in 3 s, decreased to 4.5 MPa in 14 s, and the pressure is maintained at 7 s/mm, and then increased to 14.8 MPa for curing and thickness fixation, where the hot pressing factor is in the range of 9.2 s/mm;
(10) plate turning cooling: feeding the rough plate into the plate turning machine for cooling, stacking and curing for 72 hours, to the plain plate;
(11) sanding polishing: after sanding, the plain board is sawed to the required size of the board;
(12) inspection and warehousing: grading and packaging the board according to the quality standard requirements, for warehousing; and
(13) downstream processing: in floor processing enterprises, facing decoration is performed on the board, where the facing depth only reach 10 filaments.

The density boards prepared in Embodiment 1, Embodiment 2 and Comparative Example were tested respectively. The physical and chemical performance test results of the three all met and were far higher than the standard requirements of LY/T 1611-2011 "Floor Substrate Fiberboards".

The test results are listed in Table 1.

TABLE 1

| | | Test results | | |
|---|---|---|---|---|
| Test items | Standards | Comparative example Pure MDI adhesive (thickness: 9.7 mm) | Embodiment 1 MDI adhesive + lignin adhesive (thickness: 10 mm) | Embodiment 2 MDI adhesive + lignin adhesive (thickness: 10 mm) |
| Static bending strength (MPa) | ≥35 | 58.8 | 42.1 | 41.9 |
| Internal bonding strength (MPa) | ≥1.2 | 2.5 | 2.1 | 2.0 |
| Surface bonding strength (MPa) | ≥1.2 | 2.3 | 1.7 | 1.8 |
| Average density (g/cm$^3$) | ≥0.82 | 0.84 | 0.82 | 0.83 |
| Thickness swelling rate of water absorption (%) | ≤10 | 6.2 | 5.3 | 5.2 |
| Dimensional stability (mm) | ≤0.8 | 0.8 | 0.6 | 0.5 |
| Water content (%) | 4-8 | 4.5 | 6.3 | 6.4 |
| Internal bonding strength (MPa) after boiling in 2 hours | ≥0.15 | 1.3 | 0.89 | 0.90 |
| Facing thickness (filaments) | / | 0-10 | 0-80 | 0-80 |

It can be learned from Table 1 that the performance of the density board prepared by using the two-step gluing method by using the lignin adhesive and the MDI adhesive is almost the same as that of the density board prepared by adding the single MDI adhesive, and some properties are even far better than those of the density board prepared by using the MDI adhesive. However, the facing depth of the density board prepared by using the two-step gluing method by using the lignin adhesive and the MDI adhesive can reach 20 to 80 filaments, but the facing depth of the density board prepared by adding the single MDI adhesive is only 10 filaments.

At the same time, in order to better illustrate the production applicability of the product of the present invention, the boards of Example 1, Example 2, and the comparative example were respectively processed into laminated floors. After testing, their mechanical properties were all higher than the standard (GB/T 18102-2007 "Impregnated Paper Laminated Wood Floor") standard requirements, the floor has low thickness swelling rate of water absorption and good waterproof performance, and the finished floor has low formaldehyde release. The test results are listed in Table 2.

TABLE 2

|  |  | Test results | | |
|---|---|---|---|---|
| Test items | Standards | Substrate in the Comparative Example | Substrate in Embodiment 1 | Substrate in Embodiment 2 |
| Surface wear resistance | Household Class 1 ≥ 6000 revolutions | 7000 | 7000 | 7000 |
| Static bending strength | Average ≥ 30 MPa | 40.2 | 35.5 | 35.8 |
|  | Min ≥ 24 MPa | 38.3 | 34.3 | 34.5 |
| Internal bonding strength | Average ≥ 1.0 MPa | 2.6 | 1.9 | 1.8 |
|  | Min ≥ 0.8 MPa | 2.5 | 1.8 | 1.7 |
| Surfacebonding strength | Average ≥ 1.0 MPa | 3.0 | 1.8 | 1.9 |
|  | Min > 0.8 MPa | 2.9 | 1.6 | 1.6 |
| Density | ≥0.85 g/cm$^3$ | 0.85 | 0.86 | 0.86 |
| Water content | 3%-10% | 3.3 | 6.2 | 6.3 |
| Dimensional stability | ≤0.9mm | 0.6 | 0.6 | 0.6 |
| Surface scratch resistance | 4.0 N surface decorative patterns are not scratched | 4.0 N surface decorative patterns are not scratched | 4.0 N surface decorative patterns are not scratched | 4.0 N surface decorative patterns are not scratched |
| Anti-impact | ≤10 mm | 7.4 | 7.3 | 7.3 |
| Surface cigarette burning resistance | No blackspot, crack, or bubble | No blackspot, crack, or bubble | No blackspot, crack, or bubble | v No blackspot, crack, or bubble |
| Surface dry heat resistance | No crack or bubble | No crack or bubble | No crack or bubble | No crack or bubble |
| Surface thermocycle resistance | No crack or bubble | No crack or bubble | No crack or bubble | No crack or bubble |
| Surface pollution and corrosion resistance | No pollution or corrosion | No pollution or corrosion | No pollution or corrosion | No pollution or corrosion |
| Surface crazing resistance | Upon observation by using a 6-times magnifier, there is no crack on the surface | Upon observation by using a 6-times magnifier, there is no crack on the surface | Upon observation by using a 6-times magnifier, there is no crack on the surface | Upon observation by using a 6-times magnifier, there is no crack on the surface |
| Release amount of formaldehyde | F☆☆☆☆ average value (Avg) ≤ 0.3 mg/L | 0.14 | 0.04 | 0.04 |
|  | F☆☆☆☆ maximum value (Max) ≤ 0.4 mg/L | 0.15 | 0.05 | 0.04 |

In the foregoing embodiments, the description of each embodiment has its own emphasis. For parts that are not described in detail in an embodiment, refer to the related description of other embodiments.

It may be understood that the relevant features in the foregoing apparatuses can be referred to each other. In addition, "first", "second", etc. in the foregoing embodiments are used to distinguish the embodiments, and do not represent the advantages and disadvantages of the embodiments.

The foregoing is only preferred embodiments of the present invention, and is not intended to limit the present invention in any form. Any simple modification, equivalent change and modification made to the embodiments based on the technical essence of the present invention still belong to the scope of the technical solutions of the present invention.

We claim:

1. A method for manufacturing a formaldehyde-free medium-high-density board capable of meeting deep facing requirements, comprising:
   (1) wood chipping: cutting a wood raw material into wood chips that meet the production scale;
   (2) wood screening: screening the wood chips in step (1) to remove debris, and separating oversized wood chips for further shredding;
   screening the shredded wood chips to remove the debris, and separating the oversized wood chips for further shredding;
   (3) cooking and softening: after screening, cooking and softening wood chips in step (2);
   (4) fiber separating: putting the wood chips in step (3) into a defibrator and separating fibers mechanically;
   (5) primary gluing: performing primary gluing adhesive on the fibers in step (4), where the primary gluing adhesive is a lignin adhesive;
   (6) waterproof treatment: performing waterproof treatment on the fibers in step (5) after the primary gluing in step (5), and adding paraffin wax;
   (7) secondary gluing: performing secondary gluing adhesive on the fibers in step (6) to obtain gluing fibers, where the secondary gluing adhesive is a MDI adhesive;
   (8) drying and sorting: feeding the gluing fibers in step (7) to a drying system for drying;
   (9) paving pre-pressing: paving the gluing fibers in step (8) into a slab by using a paving machine;
   (10) hot pressing forming: delivering the slab to a hot pressing machine by using a loader, for pressing into a rough board;

(11) board turning cooling: feeding the rough board in step (10) into a board turning machine for cooling, stacking and curing, to a plain board;

(12) sanding polishing: after sanding, the plain board in step (11) is sawed to a board of the required size;

(13) inspection and warehousing: grading and packaging the board in step (12) according to the quality standard requirements, for warehousing; and

(14) downstream processing: in floor processing enterprises, facing decoration is performed on the board in step (13);

the formaldehyde-free medium-high-density board capable of meeting deep facing requirements is capable of implementing 20-80-filament deep facing;

the lignin adhesive comprises components with the following weight percentages:

lignin 20% to 45%;
sodium hydroxide 2.0% to 8.5%;
melamine 2% to 8%;
polyvinyl alcohol 0.2% to 1.0%;
urea 2% to 6%; and
water 40% to 70%.

2. The method for manufacturing the formaldehyde-free medium-high-density board capable of meeting deep facing requirements according to claim 1, wherein before the hot pressing, surface spraying is added, and the surface spraying comprises: spraying free water on a surface of the slab after the pre-pressing, so that a water content of gluing fibers of the slab is 8% to 12%.

3. The method for manufacturing the formaldehyde-free medium-high-density board capable of meeting deep facing requirements according to claims 1 or 2, wherein a solid content of the lignin adhesive is 30% to 60%, and an amount of the lignin adhesive is 50 kg/m$^3$ to 80 kg/m$^3$.

4. The method for manufacturing the formaldehyde-free medium-high-density board capable of meeting deep facing requirements according to claim 1, wherein waterproof treatment is to apply a waterproof agent on surfaces of the fibers in step (5) on which the lignin adhesive is applied, the waterproof agent is paraffin wax, and an amount of the paraffin wax is 4 kg/m$^3$ to 6 kg/m$^3$.

5. The method for manufacturing the formaldehyde-free medium-high-density board capable of meeting deep facing requirements according to claim 1, wherein before the secondary gluing, a ratio of the MDI adhesive to water is adjusted to 1:1 to 1:3 based on an initial viscosity of the MDI adhesive, and an amount of the MDI adhesive is 10 kg/m$^3$ to 40 kg/m$^3$; the MDI adhesive and water separately pass through separate pumps and are mixed in a tee, and performing the secondary gluing adhesive on the fibers in step (7) is under high-pressure jetting.

6. The method for manufacturing the formaldehyde-free medium-high-density board capable of meeting deep facing requirements according to claim 1, wherein the wood raw material is one or more of *eucalyptus* wood, cotton wood, pine wood, and mixed hard woods.

7. The method for manufacturing the formaldehyde-free medium-high-density board capable of meeting deep facing requirements according to claim 1, wherein in the drying and sorting step, the gluing fibers in step (7) is dried to a water content of 5% to 10%.

* * * * *